US009753211B2

(12) United States Patent
Takatori et al.

(10) Patent No.: US 9,753,211 B2
(45) Date of Patent: Sep. 5, 2017

(54) LIGHT EMITTING DEVICE, SURFACE LIGHT SOURCE DEVICE AND DISPLAY APPARATUS

(71) Applicant: Enplas Corporation, Saitama (JP)

(72) Inventors: Hiroshi Takatori, Saitama (JP); Yu Kamijo, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 14/704,147

(22) Filed: May 5, 2015

(65) Prior Publication Data

US 2015/0323729 A1 Nov. 12, 2015

(30) Foreign Application Priority Data

May 8, 2014 (JP) .................................. 2014-097174

(51) Int. Cl.
*F21V 8/00* (2006.01)
*G02F 1/1335* (2006.01)

(52) U.S. Cl.
CPC ......... *G02B 6/0051* (2013.01); *G02B 6/0055* (2013.01); *G02B 6/0073* (2013.01);
(Continued)

(58) Field of Classification Search
CPC .. G02B 6/0051; G02B 6/0055; G02B 6/0073; G02B 6/0018; G02B 6/0053; G02F 1/133603; G02F 1/133605; G02F 2001/133607; G02F 1/133615; F21Y 2101/02; F21Y 2105/001; F21Y 2113/005; F21Y 2103/003; G06F 3/0317; C09K 11/00; H01L 51/5271; H01L 51/5268; H01L 2924/12044; F21K 9/00;
(Continued)

(56) References Cited

U.S. PATENT DOCUMENTS 7,991,257 B1 * 8/2011 Coleman ............ B29D 11/0073
264/1.24
2008/0291682 A1 * 11/2008 Falicoff .............. G02B 19/0061
362/310
(Continued)

FOREIGN PATENT DOCUMENTS

JP 2010-537400 A 12/2010
JP 2013-218940 A 10/2013

*Primary Examiner* — Stephen F Husar
(74) *Attorney, Agent, or Firm* — Brundidge & Stanger, P.C.

(57) ABSTRACT

A light emitting device includes a substrate in which a specular reflection area that specularly reflects reaching light is disposed on one surface, a light emitting element disposed on the substrate to emit light at least from a side surface, and a light flux controlling member disposed over the light emitting element to control a distribution of light to be emitted from the light emitting element. The light flux controlling member includes a rear surface disposed closer to the substrate, an incidence surface being an inner surface of a recess opening toward the rear surface and receiving light emitted from the light emitting element, and an emission surface emitting at least a part of the light incident through the incidence surface toward an outside. An outer edge portion of the specular reflection area is positioned outside an opening edge portion of the recess.

5 Claims, 8 Drawing Sheets

(52) U.S. Cl.
CPC .. *G02F 1/133603* (2013.01); *G02F 1/133605* (2013.01); *G02F 2001/133607* (2013.01)

(58) Field of Classification Search
CPC ........ F21K 9/52; H04N 9/315; H04N 9/3161; H05K 2201/10106; G06K 7/10732; G09F 13/00; G11B 7/1372
See application file for complete search history.

(56) References Cited

U.S. PATENT DOCUMENTS

2009/0045416 A1    2/2009  Bierhuizen et al.
2014/0301063 A1*  10/2014  Hikmet .................... F21V 9/16
                                                                    362/84

\* cited by examiner

LIGHT EMITTING DEVICE, SURFACE LIGHT SOURCE DEVICE AND DISPLAY APPARATUS

CROSS REFERENCE TO RELATED APPLICATIONS

This application is entitled to and claims the benefit of Japanese Patent Application No. 2014-097174, filed on May 8, 2014, the disclosure of which including the specification, drawings and abstract is incorporated herein by reference in its entirety.

TECHNICAL FIELD

The present invention relates to a light emitting device having a light emitting element and a light flux controlling member, a surface light source device and an illumination apparatus having the light emitting device.

BACKGROUND ART

Some transmission type image display apparatuses such as liquid crystal display apparatuses use a direct surface light source device. In recent years, surface light source devices having a plurality of light emitting elements as the light source have been used.

For example, the surface light source device includes a substrate, a plurality of light emitting elements, a plurality of light flux controlling members, and a light diffusion plate. The plurality of light emitting elements is disposed on the substrate in a matrix manner. The light flux controlling member that expands light emitted from each of the light emitting elements in the plane direction of the substrate is disposed over each of the light emitting elements. The light emitted from each of the light emitting elements is diffused by the light flux controlling member to irradiate a member to be irradiated (e.g., liquid crystal panel) in a planar manner (see, e.g., PTL 1).

FIG. 1 is a drawing illustrating the configuration of a surface light source device (back light device) disclosed in PTL 1. As illustrated in FIG. 1, back light device (surface light source device) 10 disclosed in PTL 1 includes a mounting substrate 20 in which insulating layer 21, wiring layer 22 and resist layer 23 are laminated in order, package 30 disposed on mounting substrate 20 and including a light emitting chip (light emitting element) 32 that emits light through its upper surface, the package 30 being electrically connected to mounting substrate 20 via solder layer 31, diffusion lens (light flux controlling member) 40 disposed on mounting substrate 20 in such a manner as to cover package 30 to control the distribution of light emitted from light emitting chip 32, and diffusion plate 50 that transmits light emitted from diffusion lens 40 while diffusing the light. Diffusion lens 40 has lens part 41 that expands light emitted from package 30, and a fixing part 42 for fixing lens part 41 to mounting substrate 20 via adhesive 46. Lens part 41 has bottom surface 43 closer to mounting substrate 20, recessed light incidence surface 44 opening toward bottom surface 43, and light emission surface 45 disposed opposite to light incidence surface 44.

The light emitted from light emitting chip 32 enters diffusion lens 40 through light incidence surface 44. The light having entered diffusion lens 40 is emitted toward the outside of diffusion lens 40 through light emission surface 45. Then, the light emitted toward the outside is transmitted through diffusion plate 50 while being diffused to thereby irradiate a member to be irradiated in a planar manner.

In addition, PTL 2 discloses a flip-chip type LED that emits light from the side surface. The LED disclosed in PTL 2 is designed to emit light from the side surface by disposing a reflective film on the upper surface of a phosphor layer that emanates light.

CITATION LIST

Patent Literature

PTL 1
Japanese Patent Application Laid-Open No. 2013-218940
PTL 2
Japanese Unexamined Patent Application Publication (Translation of PCT Application) No. 2010-537400

SUMMARY OF INVENTION

Technical Problem

Back light device 10 disclosed in PTL 1 optimizes the efficiency of the incidence of light emitted from light emitting chip 32 into diffusion lens 40 by disposing diffusion lens 40 upward over the upper surface of package 30. On the other hand, there is a possibility for many reasons that the LED that emits light from the side surface as disclosed in PTL 2 may be installed in back light device 10 disclosed in PTL 1.

However, when the LED disclosed in PTL 2 is installed in back light device 10 disclosed in PTL 1, the LED disclosed in PTL 2 emits light from the side surface, and thus a part of the light emitted from the side surface of the LED reaches mounting substrate 20. Then, a part of the light having reached mounting substrate 20 is diffused at resist layer 23 to enter diffusion lens 40 through bottom surface 43 of diffusion lens 40, so that the light having entered diffusion lens 40 has a risk of being uncontrollable light. Thus, the surface light source device (back light device) disclosed in PTL 1 has a problem of not being able to control light emitted from the light emitting element to be a desired light distribution when used for the light emitting element that emits light from the side surface.

Therefore, an object of the present invention is to provide a light emitting device having a light emitting element that emits light at least from the side surface and being capable of controlling light emitted from the light emitting element to be a desired light distribution.

Another object of the present invention is to provide a surface light source device and a display apparatus having the light emitting device.

Solution to Problem

A light emitting device of the present invention is a light emitting device including: a substrate in which a specular reflection area that specularly reflects reaching light is disposed on one surface; a light emitting element disposed on the substrate to emit light at least from a side surface; and a light flux controlling member disposed over the light emitting element to control a distribution of light to be emitted from the light emitting element, wherein: the light flux controlling member includes a rear surface disposed closer to the substrate, an incidence surface being an inner surface of a recess opening toward the rear surface and receiving light emitted from the light emitting element, and an emission surface emitting at least a part of the light incident through the incidence surface toward an outside; and an outer edge portion of the specular reflection area is positioned outside an opening edge portion of the recess.

A surface light source device of the present invention includes the light emitting device of the present invention, and a light diffusing member that transmits light from the light emitting device while diffusing the light.

A display apparatus of the present invention includes the surface light source device of the present invention, and a display member to be irradiated with light emitted from the surface light source device.

Advantageous Effects of Invention

According to the present invention, it is possible to properly control the distribution of light emitted from a light emitting element, while having a light emitting element that emits light from the side surface. Accordingly, the surface light source device and the display apparatus according to the present invention have less luminance unevenness.

DESCRIPTION OF EMBODIMENTS

Hereinafter, embodiments of the present invention will be described in detail with reference to the accompanying drawings. In the following description, as a typical example of the surface light source device according to the present invention, a surface light source device suitable as a back light of a liquid crystal display apparatus will be described. When used with a member to be irradiated (e.g., liquid crystal panel) with light from the surface light source device, the surface light source device can be used as a display apparatus.

[Embodiment 1]

(Configurations of Surface Light Source Device)

Figure 1:
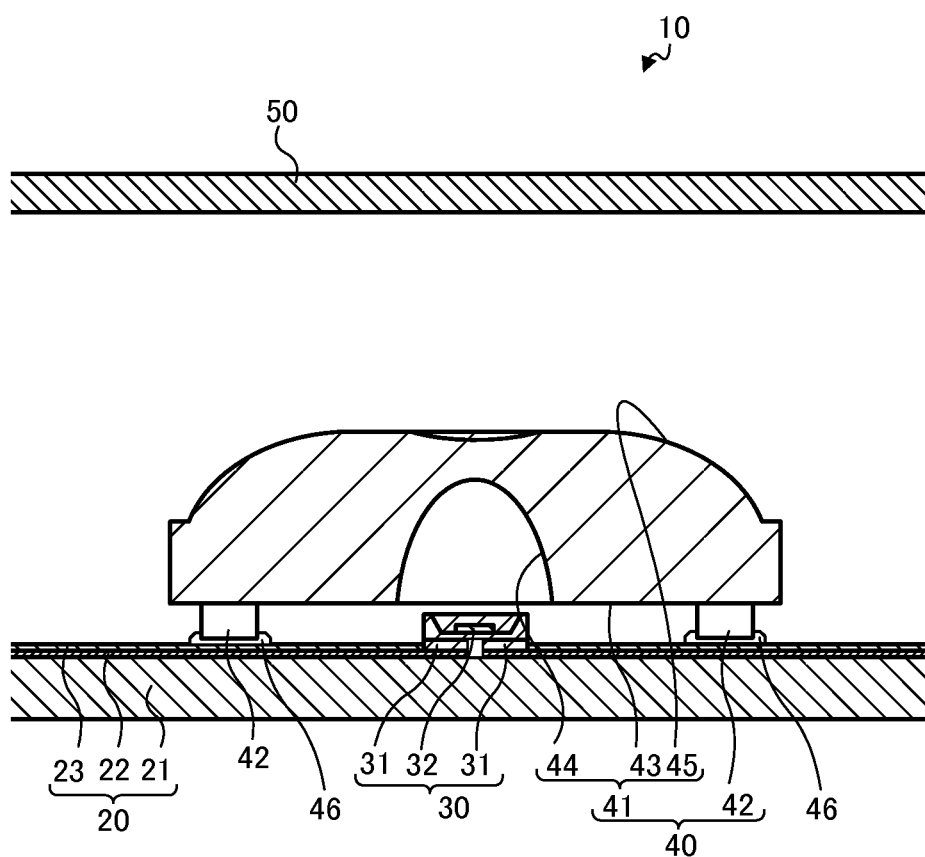
FIG. 1 is a drawing illustrating a configuration of a back light device disclosed in PTL 1.
Figure 2A:
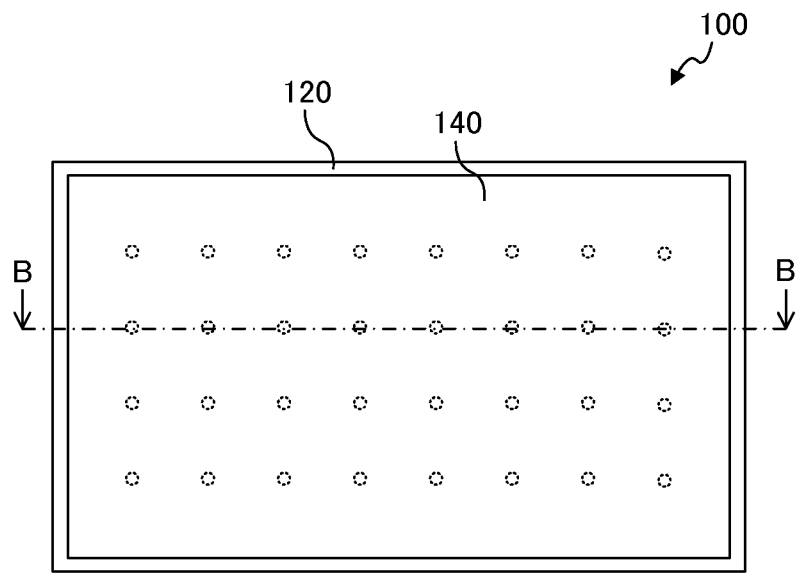
FIGS. 2A and 2B are drawings illustrating a configuration of a surface light source device according to Embodiment 1.
Figure 2B:
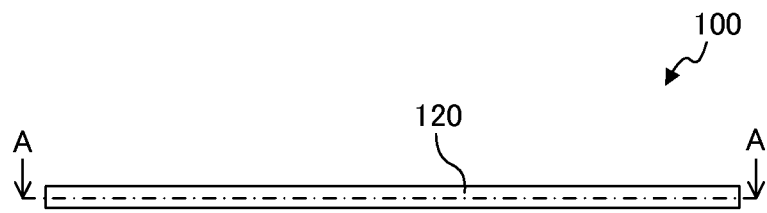
Figure 3A:
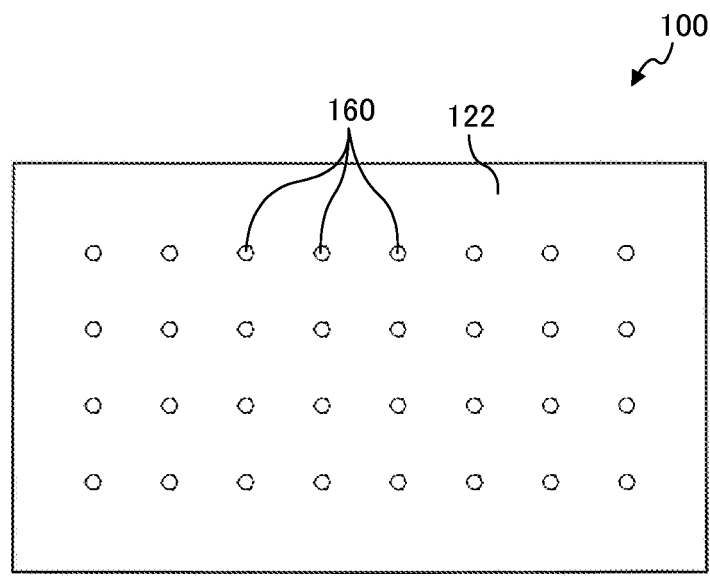
FIGS. 3A and 3B are sectional views of the surface light source device according to Embodiment 1.
Figure 3B:
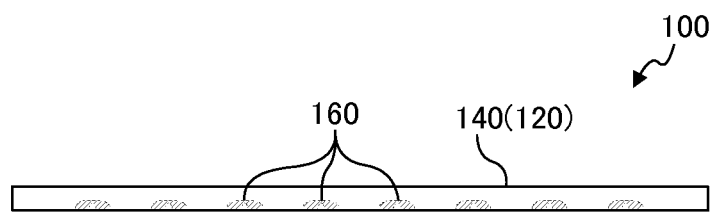

FIGS. 2A, 2B, 3A and 3B are drawings illustrating the configuration of surface light source device 100 according to Embodiment 1 of the present invention. FIG. 2A is a plan view of surface light source device 100 according to the present embodiment, and FIG. 2B is a front view of surface light source device 100. FIG. 3A is a sectional view taken along line A-A illustrated in FIG. 2B, and FIG. 3B is a sectional view taken along line B-B illustrated in FIG. 2A.

As illustrated in FIGS. 2A, 2B, 3A and 3B, surface light source device 100 according to the present embodiment includes casing 120, light diffusing member 140, and a plurality of light emitting devices 160. A plurality of light emitting devices 160 is disposed over bottom plate 122 of casing 120 in a matrix manner. The inner surface of bottom plate 122 functions as a diffusion and reflection surface. In addition, the top plate of casing 120 is provided with an opening. The size of the opening is, for example, about 400 mm×about 700 mm (32 inches), although the size thereof is not particularly limited.

Light diffusing member 140 is disposed in such a manner as to cover the opening of casing 120. Light diffusing member 140 is a plate-like member having a light diffusing property, and transmits light emitted from light emitting device 160 while diffusing the light. Typically, the size of light diffusing member 140 is substantially the same as that of a member to be irradiated, such as a liquid crystal panel. For example, light diffusing member 140 is formed of optically transparent resins such as polymethylmethacrylate (PMMA), polycarbonate (PC), polystyrene (PS), and styrene methyl methacrylate copolymerization resin (MS). In order to provide a light diffusing property, fine irregularities are formed on the surface of light diffusing member 140, or light diffusers such as beads are dispersed inside light diffusing member 140.

(Configuration of Light Emitting Device)

Figure 4:
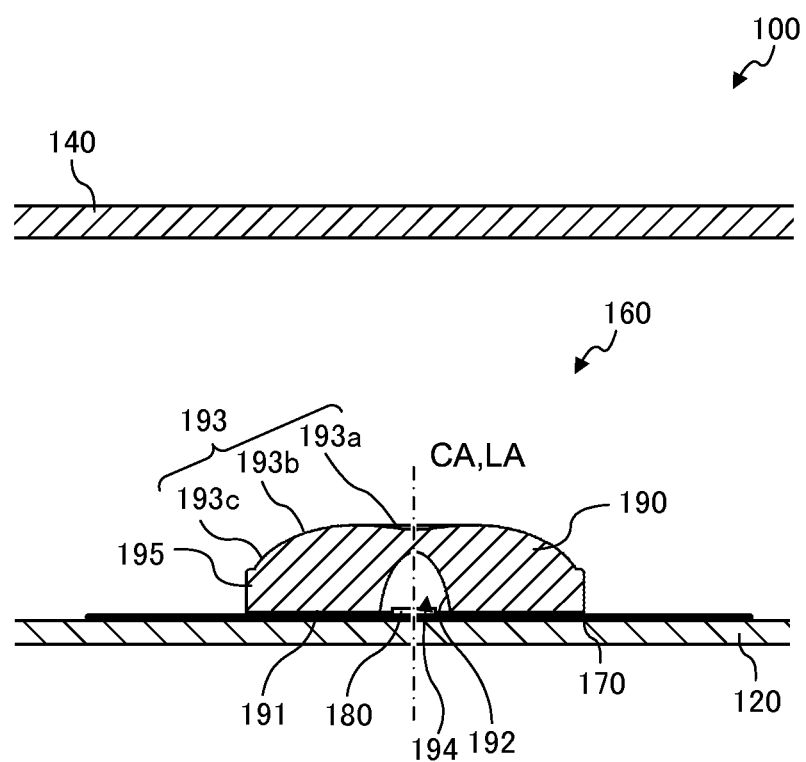
FIG. 4 is a partially enlarged sectional view of the surface light source device according to Embodiment 1.
Figure 5A:
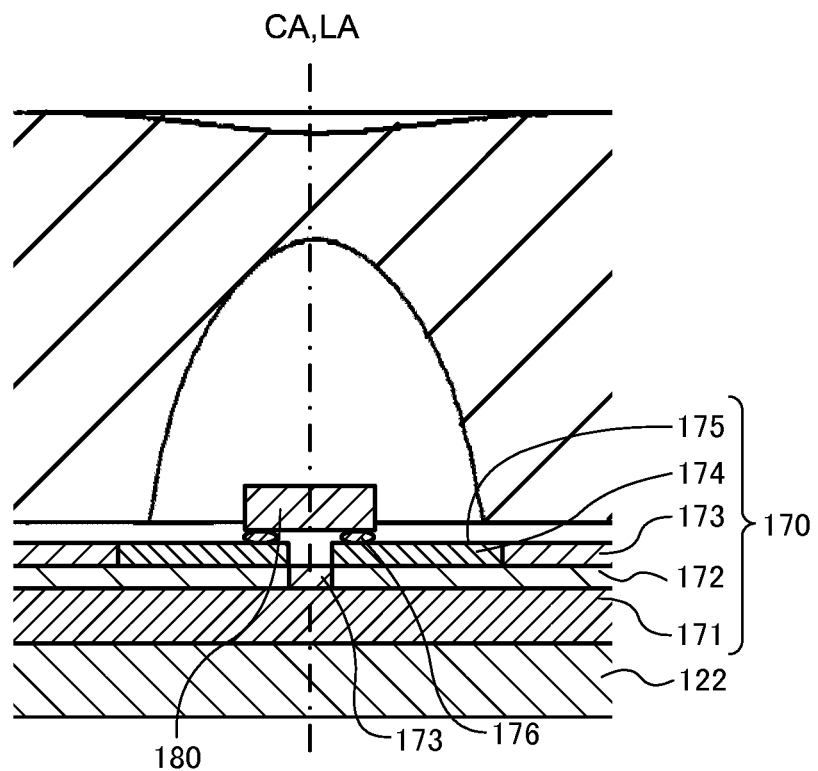
FIGS. 5A and 5B are partially enlarged sectional views of a light emitting device according to Embodiment 1, and of a substrate and a light emitting element, respectively.

FIG. 4 is a partially enlarged sectional view of surface light source device 100 (a partially enlarged sectional view of FIG. 3B). FIG. 5A is a partially enlarged sectional view of light emitting device 160 (a partially enlarged sectional view of FIG. 4), and FIG. 5B is a partially enlarged plan view of substrate 170 and light emitting element 180.

Figure 5B:
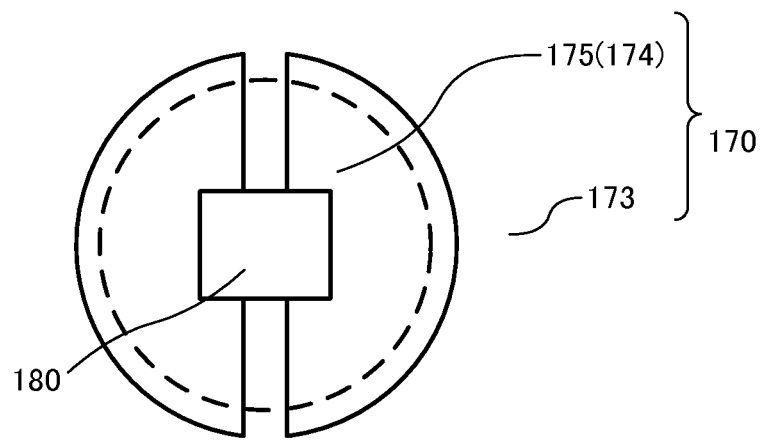

As illustrated in FIGS. 4, 5A and 5B, each of a plurality of light emitting devices 160 has substrate 170, light emitting element 180, and light flux controlling member 190.

Substrate 170 is a tabular member, and supports light emitting element 180 and light flux controlling member 190. Substrate 170 has substrate main body 171, two copper foil layers 172, resist layer 173, and two plated layers 174.

Substrate main body 171 is a tabular insulator. The shape of substrate main body 171 in a plan view is not particularly limited. The shape of substrate main body 171 in a plan view either may be circular, or may be polygonal. In the present embodiment, the shape of substrate main body 171 in a plan view is rectangular. In addition, the thickness of substrate main body 171 is not particularly limited, and may be appropriately set. Further, the material for composing substrate main body 171 is not particularly limited insofar as the material is an insulator. In the present embodiment, substrate main body 171 is a glass epoxy substrate.

Two copper foil layers 172 are spaced apart from each other on substrate main body 171. Two copper foil layers 172 interpose resist layer 173 therebetween, and are insulated from each other. Two copper foil layers 172 are connected respectively to two terminals of light emitting element 180 through plated layer 174 and solder layer 176 to function as wiring. The arrangement of two copper foil layers 172 on substrate main body 171 is not particularly limited insofar as two copper foil layers 172 function as wiring of light emitting element 180, and may be appropriately set. In addition, the thickness of copper foil layer 172 is not particularly limited, and may be appropriately set.

Resist layers 173 are disposed on and between two copper foil layers 172, and mainly protect two copper foil layers 172. A material composing resist layer 173 is not particularly limited insofar as the material has an insulation property and can protect copper foil layers 172, and may be appropriately selected from known materials.

Plated layers 174 are disposed respectively on two copper foil layers 172. Plated layer 174 electrically connects solder layer 176 to which light emitting element 180 is fixed to copper foil layer 172. The type of plated layer 174 is not particularly limited insofar as it has electrical conductivity. Examples of plated layer 174 include solder plating. In addition, the surface, closer to light emitting element 180, of plated layer 174 functions as specular reflection area 175 that specularly reflects light emitted from light emitting element 180. That is, specular reflection area 175 is disposed on one surface of substrate 170 in such a manner as to surround the periphery of light emitting element 180 except a part of the periphery. In the present embodiment, the surface of plated layer 174 is subjected to mirror finishing, and thus the surface of plated layer 174 functions as specular reflection area 175. The shape of specular reflection area 175 in a plan view is not particularly limited. In the present embodiment, the shape of specular reflection area 175 in a plan view is substantially semicircular. It is noted that surface light source device 100 according to the present embodiment has one feature of having specular reflection area 175 in a specific area directly under light flux controlling member 190. Thus, the position of specular reflection area 175 will be described later.

Light emitting element 180 is a light source of surface light source device 100, and is disposed over specular reflection area 175 of substrate 170. Light emitting element 180 is not particularly limited insofar as light emitting element 180 is a light source that emits light at least from the side surface. In the present embodiment, light emitting element 180 is a flip type light emitting diode (LED) that emits light from the top surface and the side surface. Two terminals at the bottom surface of light emitting element 180 are fixed respectively to plated layers 174 to allow light emitting element 180 to be electrically connected to copper foil layers 172.

Light flux controlling member 190 is a diffusion lens that controls the distribution of light emitted from light emitting element 180, and is fixed over substrate 170. Light flux controlling member 190 is disposed over light emitting element 180 such that its central axis CA coincides with optical axis LA of light emitting element 180. A gap is formed between the surface of substrate 170 on which light emitting element 180 is mounted and rear surface 191 of light flux controlling member 190, for releasing heat generated from light emitting element 180 to the outside. The distance in the direction of central axis CA between the rear surface and substrate 170 is preferably shorter, although the distance is not particularly limited. It is noted that the term "optical axis LA of light emitting element" means the central light beam of a three-dimensional light flux from light emitting element 180.

Light flux controlling member 190 is formed by integral molding. The material for light flux controlling member 190 is not particularly limited insofar as the light of a desired wavelength can pass through the material. Examples of the material for light flux controlling member 190 include optically transparent resins such as polymethylmethacrylate (PMMA), polycarbonate (PC) and epoxy resin (EP), and glass.

In light emitting device 160 according to the present embodiment, light emitted from each light emitting element 180 is expanded by each light flux controlling member 190 in such a manner as to irradiate a wider range of light diffusing member 140. Light emitted from each light emitting device 160 is diffused further by light diffusing member 140. Consequently, surface light source device 100 according to the present embodiment can evenly irradiate a planar member to be irradiated (e.g., liquid crystal panel).

(Configuration of Light Flux Controlling Member)

As illustrated in FIG. 4, light flux controlling member 190 includes rear surface 191, incidence surface 192, and emission surface 193. In addition, in light flux controlling member 190, flange 195 may be disposed between rear surface 191 and emission surface 193. Further, rear surface 191 may have a leg thereon for forming a gap between light emitting device 180 and light flux controlling member 190.

Rear surface 191 is a planar surface disposed closer to substrate 170 and extending in the direction orthogonal to central axis CA (optical axis LA of light emitting element 180). The central portion of rear surface 191 has opening recess 194 of which inner surface is incidence surface 192. The shape of rear surface 191 in a plan view is not particularly limited. In the present embodiment, the shape of rear surface 191 in a plan view is circular.

Incidence surface 192 receives light emitted from a light source. Incidence surface 192 is an inner surface of recess 194 opening toward rear surface 191. Incidence surface 192 is a rotationally symmetrical plane, and the central axis of incidence surface 192 coincides with central axis CA of light flux controlling member 190.

Emission surface 193 is disposed opposite to rear surface 191. Emission surface 193 emits at least a part of light having entered incidence surface 192. Emission surface 193 has first emission surface 193a positioned on the periphery of central axis CA, second emission surface 193b formed continuously around first emission surface 193a, and third emission surface 193c connecting second emission surface 193b to flange 195. First emission surface 193a is a smooth curved surface being convex downward (toward light emitting element 180). Second emission surface 193b is a smooth curved surface being convex upward (toward light diffusing member 140) positioned around first emission surface 193a. Third emission surface 193c is a smooth curved surface positioned around second emission surface 193b. In the cross-section illustrated in FIG. 4, the cross-section of third emission surface 193c either may be linear, or may be curved.

Flange 195 is positioned between the outer peripheral portion of emission surface 193 and the outer peripheral portion of rear surface 191, and protrudes in the direction orthogonal to central axis CA (optical axis LA of light emitting element 180). While flange 195 is not always necessary, providing flange 195 makes it easier to handle and align light flux controlling member 190. The thickness of flange 195 is not particularly limited, and is determined taking account of an area required for emission surface 193, the molding property of flange 195, or the like. When light flux controlling member 190 is manufactured by injection molding, gate mark (illustration omitted) sometimes may be formed on flange 195. In addition, a plurality of protruding portions (illustration omitted) for allowing an apparatus for manufacturing surface light source device 100 to recognize the direction of light flux controlling member 190 may be formed on flange 195.

In addition, light flux controlling member 190 may have a plurality of legs. The legs are columnar members protruding downward (toward light emitting element 180) from rear surface 191 around recess 194. A plurality of legs performs a function of aligning light flux controlling member 190 at an appropriate position with respect to light emitting element 180.

In light flux controlling member 190 according to the present embodiment, light emitted from light emitting element 180 enters light flux controlling member 190 through incidence surface 192. Then, a part of the incident light is emitted toward the outside of light flux controlling member 190 through emission surface 193. In addition, a part of the incident light is reflected toward rear surface 191 by Fresnel reflection. In light emitting device 160 according to the present embodiment, specular reflection area 175 is designed also taking account of the Fresnel-reflected light.

Figure 6A:
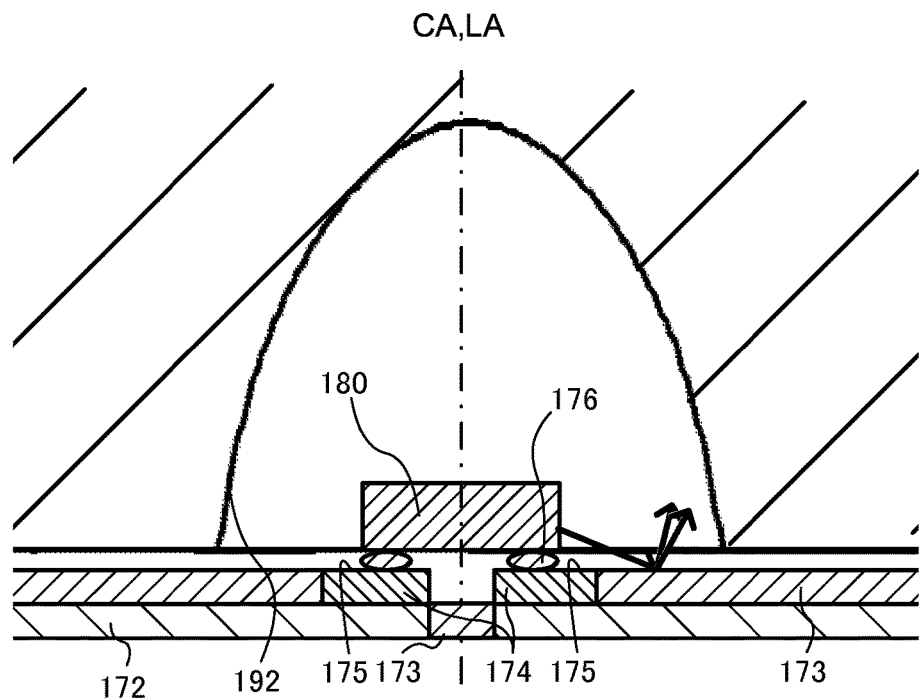
FIGS. 6A and 6B are views of optical path near a light emitting element in a light emitting device for comparison, and of optical path near a light emitting element in the light emitting device according to Embodiment 1, respectively.
Figure 6B:
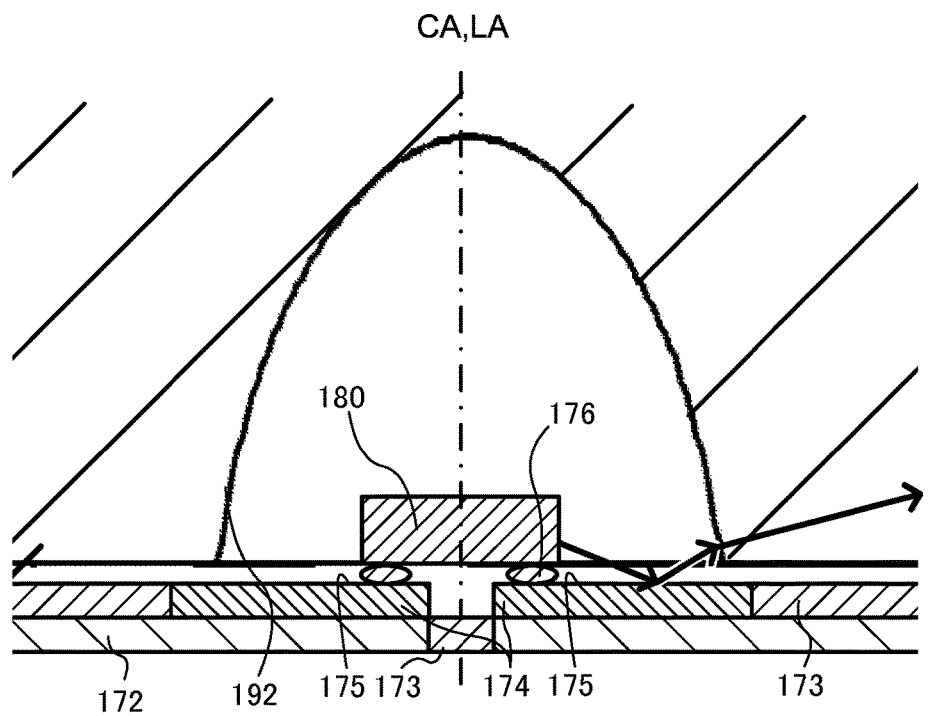

Next, the positional relationship between light flux controlling member 190 and specular reflection area 175 will be described with reference to FIGS. 6A and 6B. FIGS. 6A and 6B are views of optical path near a light emitting element in a light emitting device for comparison, and of optical path near the light emitting element in the light emitting device according to the present embodiment, respectively. The light emitting device illustrated in FIG. 6A and the light emitting device illustrated in FIG. 6B differ from each other in the size of specular reflection area 175, and consequently the positions of the outer edges of specular reflection areas 175 differ from each other.

As illustrated in FIG. 6A, when the outer edge portion of specular reflection area 175 is positioned inside the opening edge portion of recess 194 (positioned closer to central axis CA), a part of light emitted from the side surface of light emitting element 180 undesirably reaches resist layer 173 directly. The light thus having reached resist layer 173 is scattered by resist layer 173 to undesirably become uncontrollable light.

On the other hand, as illustrated in FIG. 6B, also when the outer edge portion of specular reflection area 175 is positioned outside the opening edge of recess 194, a part of light emitted from the side surface of light emitting element 180 reaches substrate 170. However, all the light having reached substrate 170 is specularly reflected at specular reflection area 175 to enter light flux controlling member 190 through incidence surface 192. Thus, the light specularly reflected at specular reflection area 175 may be properly controlled by emission surface 193 in the same manner as light having entered light flux controlling member 190 directly from light emitting element 180. That is, when the outer edge portion of specular reflection area 175 is positioned outside the opening edge of recess 194, the distribution of light emitted from light emitting element 180 can be properly controlled, even in the case of using light emitting element 180 that emits light from the side surface.

Figure 7:
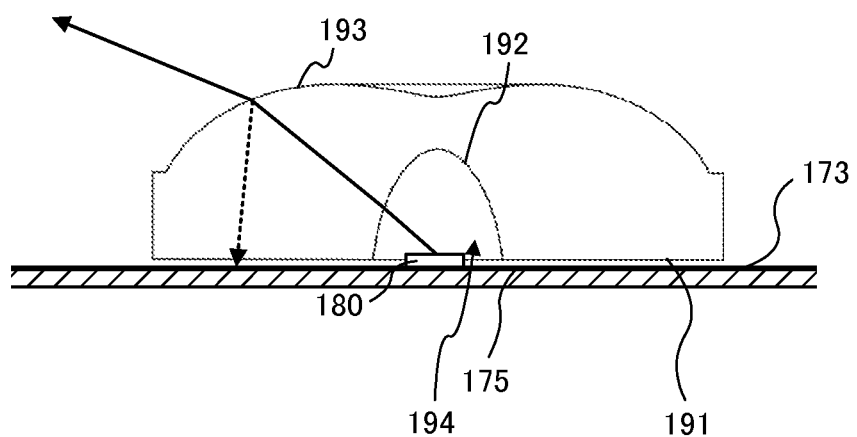
FIG. 7 is a view of optical path of the light emitting device according to Embodiment 1.

FIG. 7 is a view of optical path of light emitted from the top surface of light emitting element 180. As illustrated in FIG. 7, light emitted from the top surface of light emitting element 180 enters light flux controlling member 190 through incidence surface 192. The light having entered light flux controlling member 190 reaches emission surface 193 to be emitted toward the outside through emission surface 193 (solid line arrow). At that time, light is refracted due to the shape of emission surface 193, and thus the traveling direction of light is controlled. On the other hand, a part of the light having reached emission surface 193 is reflected at emission surface 193 (Fresnel reflection) to reach rear surface 191 (broken line arrow) that faces substrate 170 where light emitting element 180 is mounted. The light having reached rear surface 191 then reaches substrate 170. Thus, when the light having been Fresnel-reflected at emission surface 193 reaches substrate 170, diffuse reflection at resist layer 173 can inhibit a bright part from generating on light diffusing member 140 above light emitting device 160, compared with the reflection at specular reflection area 175 toward emission surface 193. Accordingly, the outer edge portion of specular reflection area 175 is preferably inside a position (closer to central axis CA) where much of the light having been Fresnel-reflected at emission surface 193 reaches rear surface 191 (resist layer 173) (inside a position where the amount of light having reached indicates the peak). The position on rear surface 191 where much of the light having been Fresnel-reflected at emission surface 193 of light flux controlling member 190 reaches can be determined by simulation or experiment, as disclosed in Japanese Patent Application Laid-Open No. 2012-004078. It is noted that even when the outer edge portion of specular reflection area 175 is outside the position where the light having been Fresnel-reflected reaches resist layer 173, light from the side surface of light emitting element 180 hardly reaches that position, and thus the effect is saturated.

(Effect)

As described above, since specular reflection area 175 larger than the opening of recess 194 is disposed around light emitting element 180, light emitting device 160 according to Embodiment 1 can properly control light emitted from light emitting element 180 even when light emitting device 180 that emits light from the side surface is used. Therefore, surface light source device 100 according to the present invention has less luminance unevenness.

[Embodiment 2]

Surface light source device 200 of Embodiment 2 differs from surface light source device 100 of Embodiment 1 only in the shape of the light flux controlling member in the light emitting device. Therefore, only light emitting device 260 according to Embodiment 2 will be described.

(Configurations of Light Emitting Device and Light Flux Controlling Member)

Figure 8A:
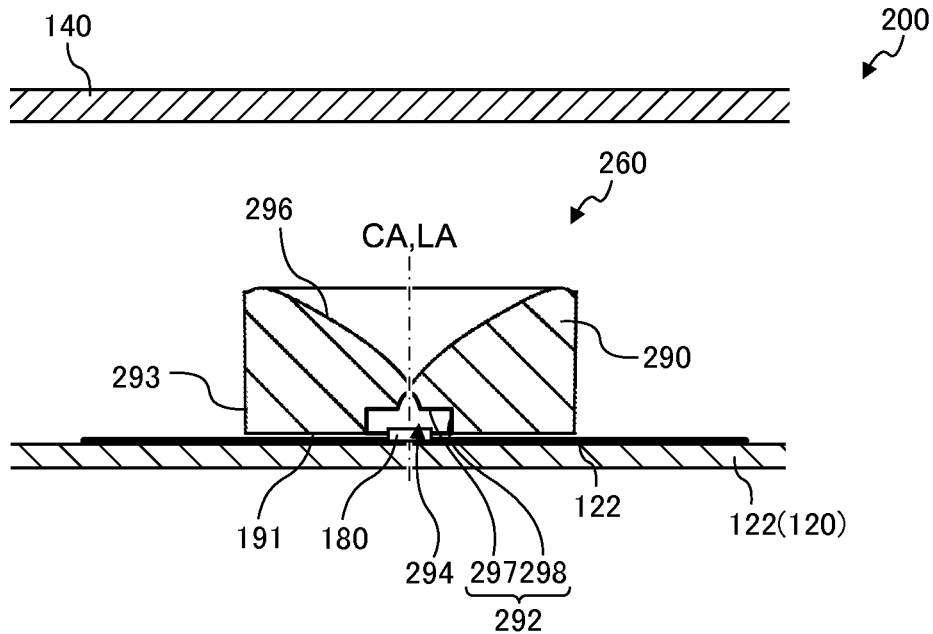
FIGS. 8A and 8B are partially enlarged sectional views of a surface light source device according to Embodiment 2, and of a light emitting device according to Embodiment 2, respectively.
Figure 8B:
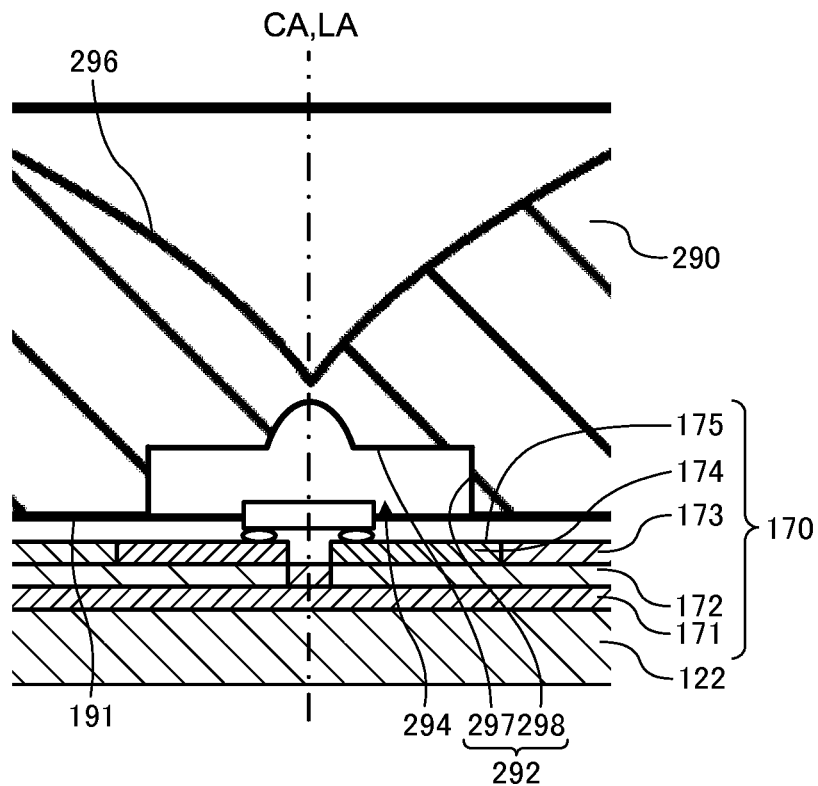

FIGS. 8A and 8B are partially enlarged sectional views of surface light source device 200 according to Embodiment 2, and of light emitting device 260 according to Embodiment 2, respectively. As illustrated in these drawings, light emitting device 260 according to Embodiment 2 has substrate 170, light emitting element 180, and light flux controlling member 290. It is noted that substrate 170 and light emitting element 180 are the same as those of Embodiment 1, and thus the descriptions therefor will be omitted.

Light flux controlling member 290 according to Embodiment 2 includes rear surface 191, incidence surface 292, reflection surface 296, and emission surface 293. Light flux controlling member 290 according to Embodiment 2 allows light having been emitted from the top surface of light emitting element 180 and having entered top surface 297 of incidence surface 292 to be reflected sideward at reflection surface 296, and then allows the light to be emitted sideward through emission surface 293 toward the outside of light flux controlling member 290. In addition, light flux controlling member 290 allows light having been emitted from the side surface of light emitting element 180 to enter side surface 298 of incidence surface 292, and then emits the light sideward through emission surface 293 toward the outside of light flux controlling member 290.

Rear surface 191 is a planar surface disposed on the back side of light flux controlling member 290. In the present embodiment, rear surface 191 is disposed in the direction orthogonal to central axis CA. The central portion of rear surface 191 has opening recess 294.

Incidence surface 292 is an inner surface of recess 294 opening toward the central portion of rear surface 191, and allows light emitted from light emitting element 180 to enter light flux controlling member 290. Incidence surface 292 is a rotationally symmetrical (point-symmetrical) plane around central axis CA. Incidence surface 292 has top surface 297 and side surface 298.

Top surface 297 is disposed to intersect central axis CA, and corresponds to the ceiling portion of recess 294. The shape of top surface 297 is not particularly limited. The shape of top surface 297 may be a planar surface. In addition, top surface 297 may have a substantially conical portion at the center of the planar surface portion. In the present embodiment, top surface 297 has a substantially conical portion at the center thereof. The shape of top surface 297 in a plan view is circular in the present embodiment, although the shape thereof is not particularly limited, Side surface 298 connects the outer peripheral portion of top surface 297 to the opening edge of recess 294. The sectional shape of side surface 298 in the direction orthogonal to central axis CA is not particularly limited. In the present embodiment, the shape of side surface 298 in the direction orthogonal to central axis CA is circular.

Reflection surface 296 reflects light having entered incidence surface 292 is reflected sideward. Reflection surface 296 is a rotationally symmetrical (point-symmetrical) plane around central axis CA of light flux controlling member 290. In addition, the generatrix line from the central portion to the outer peripheral portion of the rotationally symmetrical plane is a curve being concave relative to light emitting element 180, and reflection surface 296 is a curved surface formed by rotating the generatrix line by 360° around central axis CA as a rotation axis (see FIG. 8A). That is, reflection surface 296 has an aspherical curved surface of which height from light emitting element 180 is increased toward the outer peripheral portion away from the central portion. In addition, the outer peripheral portion of reflection surface 296 is formed at a position distant (in height) from light emitting element 180 in the direction of optical axis LA of light emitting element 180 compared with the center of reflection surface 296. For example, reflection surface 296 is an aspherical curved surface of which height from light emitting element 180 is increased toward the outer peripheral portion away from the central portion, or is an aspherical curved surface of which height from light emitting element 180 (substrate 170) is increased toward the outer peripheral portion away from the central portion between the central portion and a predetermined point, and of which height from light emitting element 180 is decreased toward the outer peripheral portion away from the central portion between the predetermined point and the outer peripheral portion. In the former case, the inclining angle of reflection surface 296 relative to the plane direction of substrate 170 becomes smaller toward the outer peripheral portion away from the central portion. On the other hand, in the latter case, reflection surface 296 has a point at which the inclining angle relative to the plane direction of substrate 170 is zero (parallel to substrate 170) near the outer peripheral portion between the central portion and the outer peripheral portion. It is noted that the term "generatrix line" generally means a straight line to draw a ruled surface, but in the present specification, is used as a term including a curve to draw reflection surface 296 that is a rotationally symmetrical plane.

Emission surface 293 emits light having entered top surface 297 and having been reflected at reflection surface 296 and light having entered side surface 298 toward the outside of light flux controlling member 190. Emission surface 293 is disposed to surround central axis CA. In the present embodiment, emission surface 293 is a curved surface along central axis CA. In the cross-section including central axis CA, the upper end of emission surface 293 is connected to reflection surface 296. On the other hand, in the cross-section including central axis CA, the lower end of emission surface 293 is connected to rear surface 191.

Also in the present embodiment, when the outer edge portion of specular reflection area 175 is positioned closer to central axis CA than the opening edge portion of recess 294 is to central axis CA, light emitted from light emitting device 180 undesirably reaches resist layer 173 directly. Thus, the light having reached resist layer 173 results in being scattered to undesirably become uncontrollable light.

On the other hand, when the outer edge portion of specular reflection area 175 is positioned outside the opening edge portion of recess 294, all the light having been emitted from the side surface of light emitting element 180 is specularly reflected at specular reflection area 175 to enter light flux controlling member 290 through incidence surface 292. Therefore, even when light emitting element 180 that emits light from the side surface is used, it is possible to properly control the distribution of light emitted from light emitting element 180.

(Effect)

As described above, surface light source device 200 of Embodiment 2 has the similar effects to those of surface light source device 100 of Embodiment 1.

It is noted that, in each of the above-described embodiments, the surface of plated layer 174 is subjected to mirror finishing to form specular reflection area 175, but the method of forming specular reflection area 175 is not limited thereto. For example, specular reflection area 175 may be formed by disposing another member having a specular reflection function on substrate 170.

INDUSTRIAL APPLICABILITY

The light emitting device and the surface light source device according to the present invention are applicable, for example, to a back light of a liquid crystal display apparatus, or a generally-used illumination apparatus.

REFERENCE SIGNS LIST

10 Back light device
20 Mounting substrate
21 Insulating layer
22 Wiring layer
23 Resist layer
30 Package
31 Solder layer
32 Light emitting chip
40 Diffusion lens
41 Lens part
42 Fixing part
43 Bottom surface
44 Light incidence surface
45 Light emission surface
46 Adhesive
50 Diffusion plate
100 Surface light source device
120 Casing
140 Light Diffusing member
160, 260 Light emitting device
170 Substrate 171 Substrate main body
172 Copper foil layer
173 Resist layer
174 Plated layer
175 Specular reflection area
176 Solder layer
180 Light emitting element
190, 290 Light flux controlling member
191 Rear surface
192, 292 Incidence surface
193, 293 Emission surface
193a First emission surface
193b Second emission surface
193c Third emission surface
194, 294 Recess
195 Flange
198, 298 Side surface
296 Reflection surface
297 Top surface
CA Central axis
LA Optical axis

The invention claimed is:

1. A light emitting device comprising:
a substrate in which a specular reflection area that specularly reflects reaching light is disposed on one surface;
a light emitting element disposed on the substrate to emit light at least from a side surface; and
a light flux controlling member disposed over the light emitting element to control a distribution of light to be emitted from the light emitting element,
wherein:
the light flux controlling member includes:
a rear surface disposed closer to the substrate,
an incidence surface being an inner surface of a recess opening toward the rear surface and receiving light emitted from the light emitting element, and
an emission surface emitting at least a part of the light incident through the incidence surface toward an outside;
an outer edge portion of the specular reflection area is positioned outside an opening edge portion of the recess; and
a part of light emitted from the side surface of the light emitting element reaches the substrate, and then, is specularly reflected at the specular reflection area to enter the light flux controlling member through the incidence surface.

2. The light emitting device according to claim 1, wherein:
the emission surface is disposed opposite to the rear surface; and
the outer edge portion of the specular reflection area is disposed inside a position where a peak amount of light is indicated which is Fresnel-reflected at the emission surface and reaches the rear surface, out of light emitted from the light emitting element and being incident through the incidence surface.

3. A surface light source device comprising:
the light emitting device according to claim 1; and
a light diffusing member that transmits light from the light emitting device while diffusing the light.

4. A display apparatus comprising:
the surface light source device according to claim 3; and
a display member to be irradiated with light emitted from the surface light source device.

5. A surface light source device comprising:
the light emitting device according to claim 2; and
a light diffusing member that transmits light from the light emitting device while diffusing the light.

* * * * *